United States Patent [19]

Lundquist

[11] Patent Number: 4,892,060
[45] Date of Patent: Jan. 9, 1990

[54] BIRD FEEDER

[76] Inventor: Timothy Lundquist, Box 386A, Tivoli, N.Y. 12583

[21] Appl. No.: 185,955

[22] Filed: Apr. 25, 1988

[51] Int. Cl.$^4$ ............................................. A01K 39/01
[52] U.S. Cl. ................................... 119/52.2; 119/57.8
[58] Field of Search ................. 119/51 R, 52 R, 52 B, 119/57, 72, 77

[56] References Cited

U.S. PATENT DOCUMENTS

| | | | |
|---|---|---|---|
| 905,278 | 12/1908 | Benefiel | 119/52 R |
| 3,152,575 | 10/1964 | Singley et al. | 119/52 A |
| 4,318,364 | 3/1982 | Bescherer | 119/51 R |
| 4,327,669 | 5/1982 | Blasbalg | 119/51 R |

FOREIGN PATENT DOCUMENTS

| | | | |
|---|---|---|---|
| 2357174 | 7/1976 | France | 119/52 R |
| 11426 | of 1895 | United Kingdom | 119/52 R |

Primary Examiner—John Weiss
Attorney, Agent, or Firm—Charles J. Brown

[57] ABSTRACT

A bird feeder in which different varieties of seed can be stored and distributed through an invertible loading tube into a manifold to which the tube removably connects in various rotational positions and then through chutes to selected seed access stations, the feeder being of modular construction to permit disassembly for washing.

10 Claims, 3 Drawing Sheets

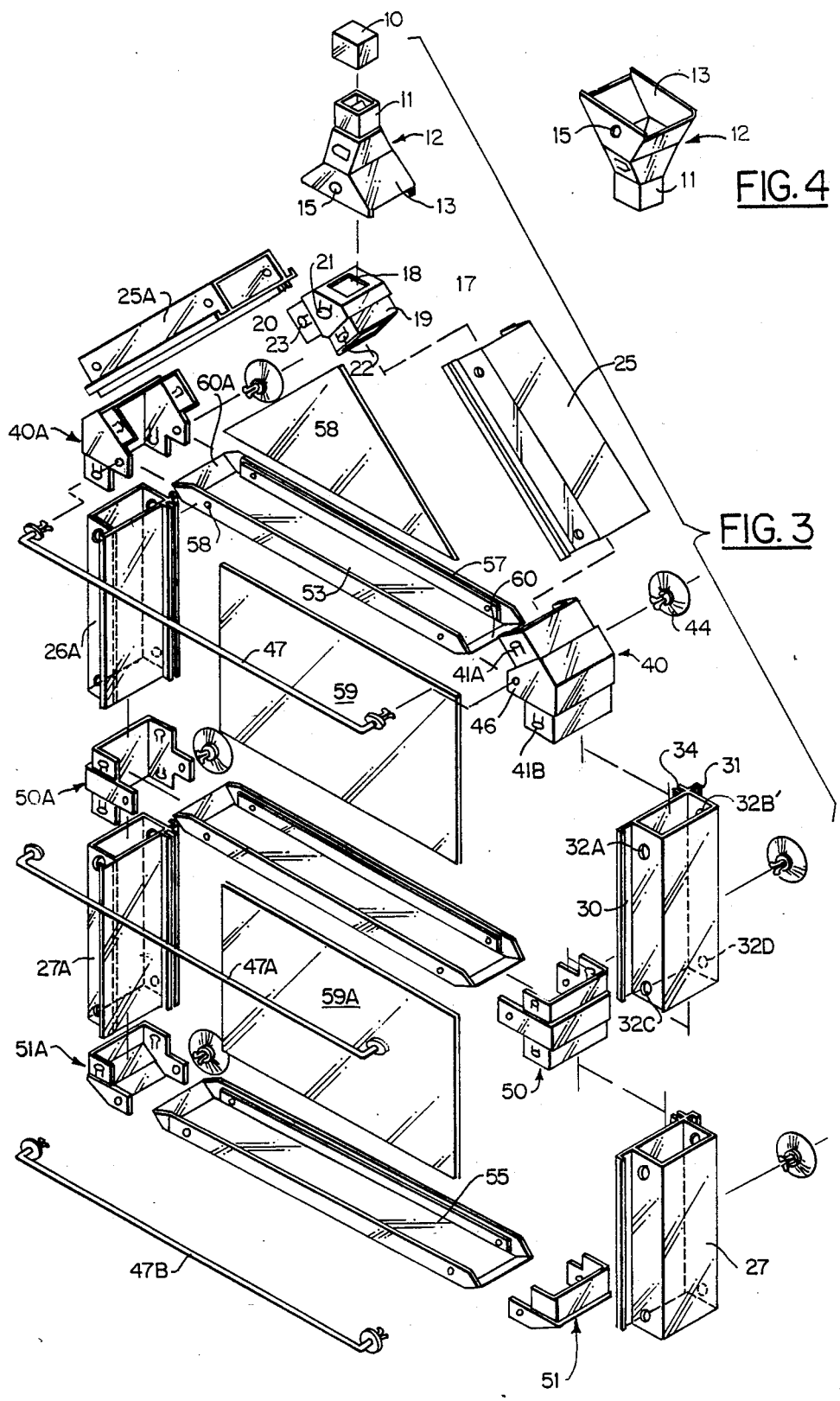

BIRD FEEDER

BACKGROUND OF THE INVENTION

Many designs of bird feeders allow seed to be gravity-fed to seed access stations at various levels, each such station typically being an aperture through which seed runs out on a shelf or tray to its angle of repose to be accessible to feeding birds. U.S. Pat. Nos. 4,201,155 and 4,356,793 are typical of such gravity-fed multiple-station feeders. It is believed, however, that no prior bird feeder design permits seed to be directed through a single loading aperture to one or the other access stations which may be selected at will. It is also believed that no conventional bird feeder design permits different varieties of seed to be selectively delivered to chosen particular stations through a single loading aperture.

It is the principal object of this invention to achieve those ends of versatile storage and distribution. Another object of the invention is to provide a bird feeder assembled in modular form of separable units, many of them interchangeable, so that the feeder can be easily disassembled for washing and also constructed in various sizes by repeating units of the module.

Whenever the term "seed" is used herein it is intended to mean any particulate material consumed by birds, whether it be grain or seeds as such or ground matter such as shells, nuts stores or other grit.

SUMMARY OF THE INVENTION

The bird feeder provided by the invention has a plurality of gravity-fed seed access stations and is adaptable for distribution and storage of a plurality of seed varieties. The feeder comprises a detachable loading tube having open entry and exit ends. In the tube a deflector is provided for directing seed out of the exit end along a path of fall offset from the tube centerline. A manifold is included which has an upper inlet and divides into two lower outlets to each side of the manifold centerline. Distribution and storage chutes descend from the respective manifold outlets to the respective seed access stations. The tube in an operating orientation may be vertically disposed with its entry end upwardly and aligned over the manifold inlet is sectioned rotational positions permitting the deflector to direct seed into selected manifold outlets and then to selected chutes and seed access stations.

In a preferred form of the feeder of the invention the tube is of funnel shape flaring at its entry end at a certain included angle. Its exit end is of square cross section. The upper inlet of the manifold is also of square cross section and is adapted to fit telescopically with the square exit end of the tube in the operating orientation of the tube. The chutes comprise first sections diverging symmetrically at an included angle equal to the flare angle of the tube, so that in a stored orientation of the tube the flared end can be closely fitted thereto. The chutes also include second vertical sections. A bottom tray is provided spanning a pair of bottom access stations and upper trays are provided spanning pairs of upper access stations. Baffles are included in the chute second sections for diverting descending seed into the respective access stations. Means are included for attaching the feeder to the exterior of the window and a one-way transparent wall is provided for viewing feeding birds through the window. A closure cap is adapted to be removably fitted to the exit end of the tube in the stored orientation of the tube. The manifold, the chute sections between the trays and the trays themselves are preferably separate modular units and quick-release interconnecting means are included for assembling the units together and disassembling them for washing.

The invention also provides a method of storing and distributing different varieties of bird seed in a gravity-fed system having a single loading aperture dividing into a pair of chutes which lead to different levels of access stations in each chute. The method of the invention comprises directing a falling stream of one variety of seed downwardly into the loading aperture and thereafter deflecting the stream selectively to one or the other or both of the chutes as desired. Then a falling stream of another variety of seed is directed downwardly into the loading aperture so that different seed varieties are available at the seed access stations.

BRIEF DESCRIPTION OF THE DRAWINGS

FIG. 3 is an exploded pictorial view of the bird feeder of the invention with the loading tube in stored orientation;

FIG. 4 illustrates the loading tube of FIG. 3 viewed in operating orientation;

DESCRIPTION OF THE PREFERRED EMBODIMENT

Figure 1:
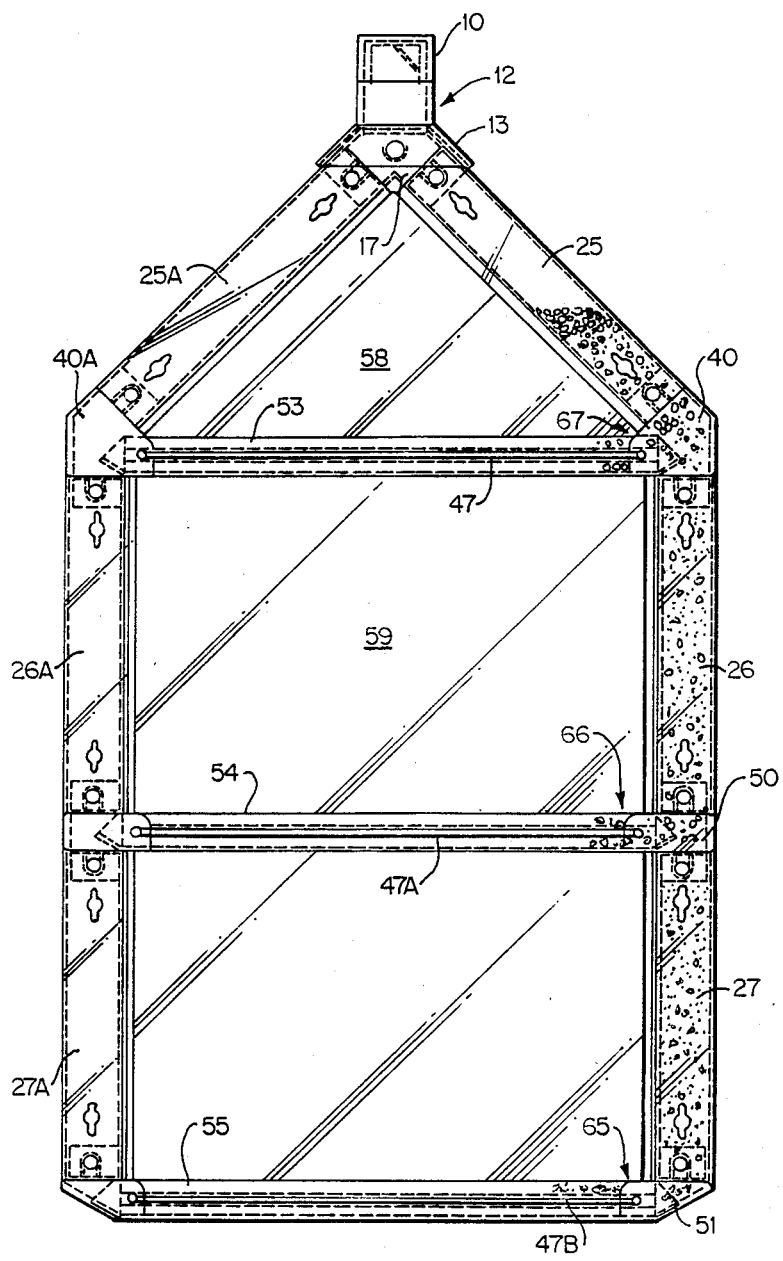
FIG. 1 is a front elevation of the assembled bird feeder of the invention with the loading tube in stored orientation.

When the feeder is filled and in use by birds the uppermost element of the assembly is a square closure cap 10 fitted over an upwardly disposed exit end 11 of a removable loading tube 12. The exit end 11 of the tube 12 is of square cross-section corresponding to that of the cap 10. Below that the tube 12 transitions in cross section to a flared entry end 13. Within the tube 12 is a deflector 14 which is an angled plate extending across the centerline of the tube 12 and designed in the operating orientation of the tube shown in FIGS. 4 and 6 to direct seed out of the exit end 11 of the tube along a path of fall offset from the tube centerline. The entry end 13 of the tube flares into funnel shape at a certain included angle. A locator hole 15 is provided in the flared end of the tube 12 for receiving quick-release snap-type connecting buttons of which there are many in the assembly as described below for joining the various parts together.

Figures 5, 6:
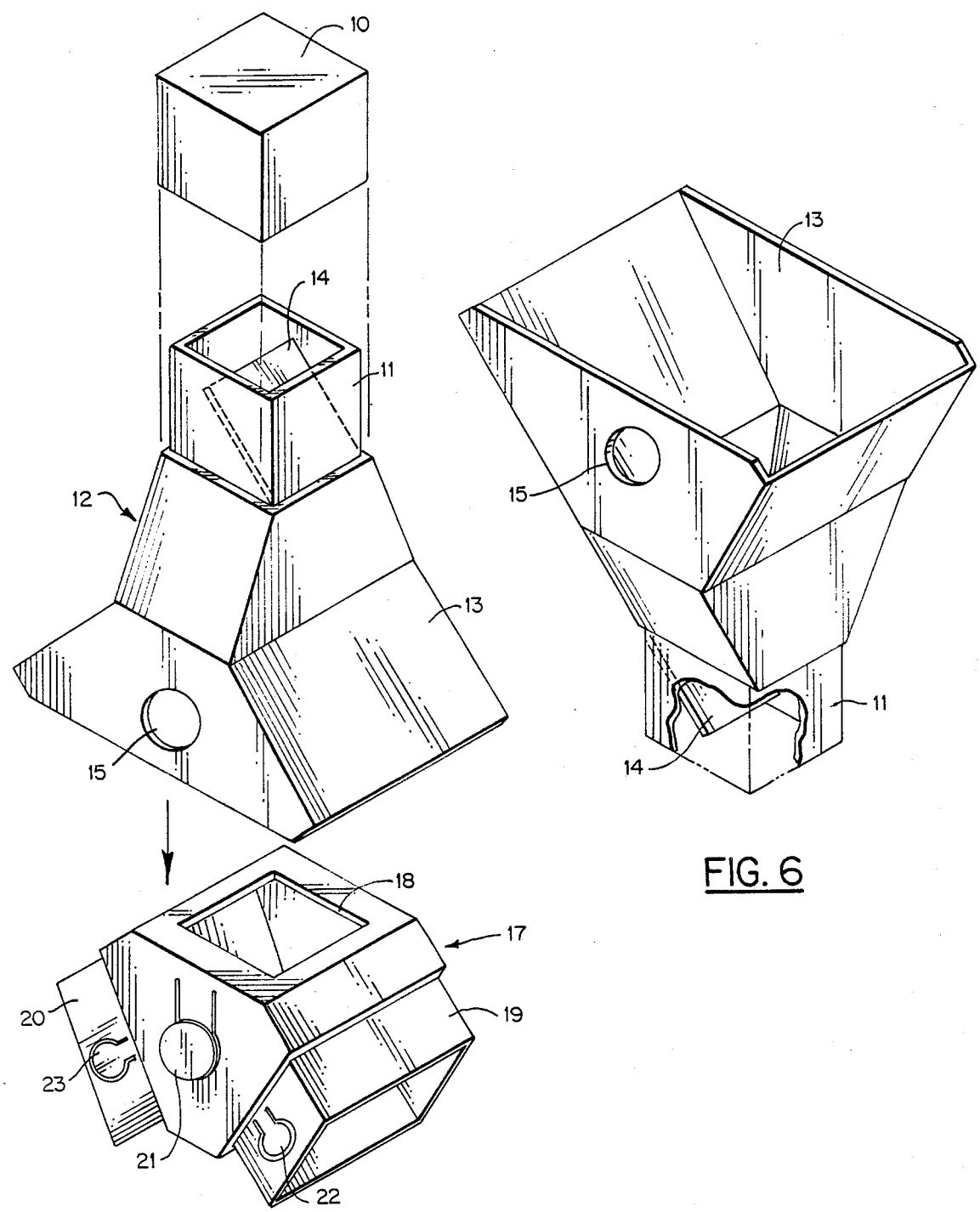
FIG. 5 is an enlarged exploded pictorial view of the closure cap, loading tube and manifold with the tube in stored orientation.
FIG. 6 is an enlarged pictorial view partly broken away of the loading tube of FIG. 5 in operating orientation.

Beneath the tube 12 is a manifold 17 which has a square upper inlet 18 corresponding to the square exit end 11 of the loading tube 12. The manifold 17 divides into two adjoining outlets 19 and 20 to each side of the manifold centerline as shown particularly in FIG. 5. A snap-in button 21 is provided on one outside wall of the manifold 17 to be received in the hole 15 in the tube 12 during assembly in stored orientation. As shown in FIG. 5 additional snap-in buttons 22 and 23 are provided in the outlets 19 and 20 respectively of the manifold for purposes described below.

In the operating orientation of the tube 12 shown in FIGS. 4 and 6 the square exit end 11 of the tube is inserted in the square inlet 18 of the manifold in a selected rotational position permitting the deflector 14 in the tube to direct a falling stream of seed into one or the other or both of the manifold outlets 19 and 20. In the rotational position shown in FIG. 6 the deflector 14 would be directing the falling seed only into the manifold outlet 19. If it were turned from that position 90 degrees the deflector 14 would divide the falling seed equally between the manifold outlets 19 and 20. If it were turned yet another 90 degrees the deflector 14 would direct the falling seed only into the manifold outlet 20.

The manifold outlets 19 and 20 diverge from the centerline of the feeder symmetrically at an included angle equal to that of the flared entry end 13 of the tube 12. Consequently in the inverted stored orientation of the tube 12 shown in FIGS. 2 and 5 the flared end 13 fits snugly over the manifold 17 and its diverging outlets 19 and 20. As is clearly shown in FIGS. 4 and 6 the flared entry end 13 of the tube 12 serves in the operating orientation as a funnel during loading of seed.

Fitted to each of the diverging outlets 19 and 20 of the manifold 17 are a pair of identical chute sections 25 and 25A respectively referred to hereinafter as first diverging chute sections. They are also identical to additional chute sections 26 and 26A and 27 and 27A, all of which are interchangeable and therefore only one need be described. The latter sections 26, 26A, 27 and 27A are referred to herein as vertical chute sections. The representative chute section 26 is a clear plastic tubular open-ended hollow element of rectangular cross-section having a front rain gutter 30 and a back rain gutter 31. Locator holes 32A, B, C and D are provided for receiving snap-in connecting buttons described hereinafter similar to the buttons 22 and 23 on the manifold 17. A channel 34 is included along one back edge of the chute section 26 for receiving an edge portion of a one-way transparent wall referred to below for viewing the feeding of birds.

The first chute sections 25 and 25A are connected at their upper end to the manifold outlets 19 and 20 and diverge symmetrically outwardly to identical corner connectors 40 and 40A. As shown particularly in FIG. 3 the corner connector 40 includes snap-in buttons 41A and B to be received in the locator holes 32A and 32B in the corresponding chute sections. The corner connector also includes a locator hole (not shown) on its back side for receiving a suction cup 44 which serves as one of the means for attaching the feeder to a window. In addition the corner connector 40 includes a locator hole 46 on its front side aligned with the hole receiving the suction cup 44 for receiving one end of a perch element 47 which may be of plastic with a textured surface for good footing by the feeding birds.

Side connectors 50 and 50A and also provided which need not be described in detail because they have similar holes and parts corresponding to those of the corner connectors 40 and 40A as is shown most clearly in FIG. 3. The side connectors 50 and 50A receive the ends of associated vertical chute sections 26A and B and 27A and B and an additional perch element 47A. Likewise bottom connectors 51 and 51A are provided at the bottom of the feeder and they too need not be described in detail because they have many of the features of the corner connectors 40 and 40A to permit attachment to the vertical chute sections 27 and 27A and a perch element 47B.

Figure 2:
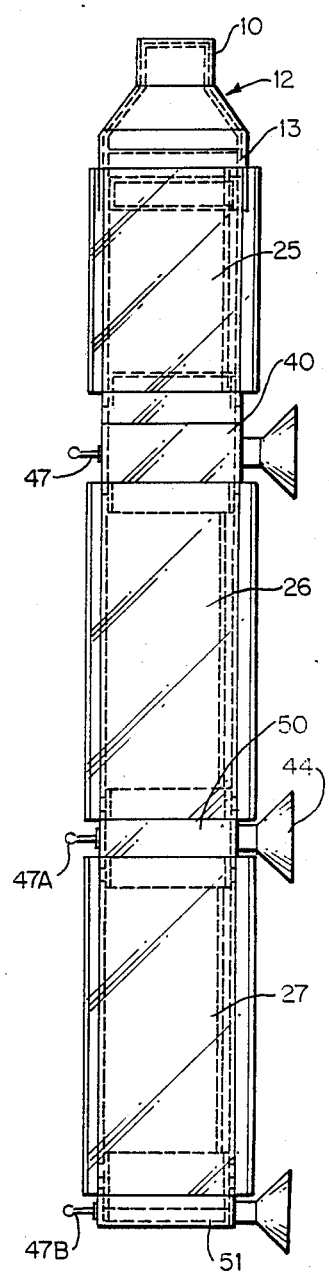
FIG. 2 is a side elevation of the bird feeder of FIG. 1.

Spanning the opposed corner connectors 40 and 40A is an upper seed tray 53. It is identical in form to a middle feed tray 54 spanning the side connectors 50 and 50A and a bottom feed tray 55 spanning the bottom connectors 51 and 51A. Since all of the trays are of the same form only the upper seed tray 55 need be described in detail. It has a channel 57 along both the top and bottom of its back edge to receive edge portions of an associated one-way transparent wall 58, which is triangular to fit under the diverging chute sections 25 and 25A, and a similar wall 59 which is rectangular. There is also another rectangular one-way transparent wall 59A at the bottom level of the feeder as shown in FIG. 2. Each of the side connectors 50 and 50A and the bottom connectors 51 and 51A has a suction cup associated with it received in a locator hole aligned with the hole receiving the end of the associated perch, just as the suction cup 44 is associated with the corner connector 40.

The tray 53 is formed with a pair of locator holes 58 at each end which register for example with the holes 46 in the corner connectors 40 and 40A into which the ends of the perch element 47 are snapped. The tray 53 may be perforated with holes in its bottom (not shown) for good drainage. At its opposite ends the tray 53 has outwardly extending baffles 60 and 60A which project into the chute sections to divert descending seed into the tray. The baffles also prevent water from flowing from the associated tray into the chute sections.

In the operation of the bird feeder of the invention loading begins with removal of the closure cap 10 from the loading tube 12. The tube 12 is then placed in its operating orientation shown in FIGS. 4 and 6 with its funnel-shaped flared entry end 13 directed upwardly. Its square exit end 11 is then fitted into the corresponding square inlet 18 of the manifold 17 so that the centerlines of the tube 12 and the manifold 17 are aligned. The deflector 14 then is in one selected position, for example as shown in FIG. 6 in position to direct seed to the chute sections 25, 26 and 27. A selected variety of feed is then poured into the flared entry end of the tube 12 and is deflected through the first diverging chute section 25 so that it falls through the second vertical tube sections 26 and 27 to the bottom connector 51. Here it is carried down the baffle of the tray 55 (the same as the baffle 60 on the tray 53) and emerges at its own angle of repose onto the tray 55 to form a seed feeding station 65 (see FIG. 1). As more of that variety of seed is directed into other feeder it accumulates until it reaches the level of the side connector 50. This filling is quite visible because all of the chute and tray sections are transparent. At this point the variety of seed being loaded can be changed so that the newly chosen variety emerges at it own angle of repose onto the middle tray 54 to define another feeding station 66 (see FIG. 1). The build-up of seed continue up through the chute section 26 until the level of the corner connector 40 is reached and here again a change may be made in the variety of seed so that what is chosen emerges down the baffle 60 onto the upper tray 53 at its own angle of repose to form a third feeding station 67 (again see FIG. 1). Thereafter a third variety of seed, or more of one of the first two varieties, can be loaded to fill the first chute section 25.

The same process can be repeated for the other side of the bird feeder, namely filling up through the chutes sections 27A and then 26A and finally 25A, simply by rotating the loading tube 12 through 180 degrees so that the deflector 14 sends seed to the outlet 20 of the manifold 12. Both legs of the feeder may be filled simultaneously by rotating the loading tube 12 to a position between those extremes so that its deflector 14 directs seed into both outlets 19 and 20 of the manifold 17 equally and at the same time. When loading is complete the tube 12 is inverted to the stored orientation shown in FIGS. 2 and 5 and the cap 10 is applied to prevent entry of moisture.

All of the elements of the entire assembly can be detached from one another very simply without tools because of the snap-in connections. Consequently it is simple to disassemble the feeder for complete washing of all of its parts. It will be apparent that the feeder of the invention may be extended by adding modular units to provide more than three tray levels or it may be reduced to only two tray levels. This versatility results from the use of interchangeable units in the modular design as described. As many as six different seed access stations in the embodiment shown can be provided with a different variety of seed to attract different species of birds. All of their feeding activity can be readily viewed through the onoe-way transparent wall and the entire assembly can be easily attached to a window.

The suction cups and perch elements are connected in their respective holes in an identical fashion and therefore it is possible to replace the suction cups with perch elements, remove the one-way transparent walls, and mount the feeder independent of a window for feeding access from all directions.

The scope of the invention is to be determined by the following claims rather than by the foregoing description of a preferred embodiment.

I claim:

1. A bird feeder having a plurality of gravity-fed seed access stations and adaptable for distribution and storage of a plurality of seed varieties comprising
   (a) a detachable loading tube having open entry and exit ends,
   (b) a deflector in the tube for directing seed out of the exit end along a path of fall offset from the tube centerline,
   (c) a manifold having an upper inlet and dividing into two lower outlets to each side of the manifold centerline, and
   (d) distribution and storage chutes descending from the respective manifold outlets to the respective seed access stations,
   (e) the tube in an operating orientation being adapted to be vertically disposed with its entry end upwardly and aligned over the manifold inlet in a selected rotational position permitting the deflector to direct seed into one or the other or both of the manifold outlets and thence to selected chutes and seed access stations.

2. A bird feeder according to claim 1 wherein the loading tube exit end and the manifold are each of square cross-section and in said operating orientation of the tube can be fitted together in different rotational positions permitting the seed path of fall to be directed by the deflector into one or the other or equally to both chutes.

3. A bird feeder according to claim 1 wherein the tube is of funnel shape flaring at its entry end.

4. A bird feeder according to claim 3 wherein the chutes diverge downwardly from the manifold outlets at a certain included angle and the flared entry end of the tube is at the same included angle, the tube being vertically invertible between the operating orientation with its flared entry end upwardly and its exit end downwardly and attached to the manifold in a stored orientation with its flared entry end downwardly and fitted over the manifold and diverging chutes.

5. A bird feeder according to claim 4 which includes a closure cap adapted to be removably fitted to the exit end of the loading tube in said stored orientation.

6. A bird feeder according to claim 1 wherein the chutes diverge outwardly in first sections and then descend in vertical second sections, the chutes leading to respective bottom seed access stations spanned by a bottom tray and to at least one pair of upper seed access stations spanned by a corresponding upper tray.

7. A bird feeder according to claim 6 wherein the manifold, the diverging and vertical chute sections between the trays and the trays themselves are each separable modular units, and quick-release interconnecting means are provided for assembling said units together and for disassembling them for washing.

8. A bird feeder according to claim 1 which includes baffles in said chutes for diverting descending seed into the respective access stations.

9. A bird feeder according to claim 1 which includes means for attaching the feeder to the exterior of a window and a one-way transparent wall for viewing feeding birds through said window.

10. A bird feeder having a plurality of gravity-fed seed access stations and adaptable for distribution and storage of a plurality of seed varieties comprising
   (a) a detachable loading tube flared in funnel shape at an open entry end at a certain included angle and having an open exit end of square cross section;
   (b) a deflector in the tube for directing seed out of the exit end along a path of fall offset from the tube centerline in an operating orientation of the tube wherein the entry end is upwardly;
   (c) a manifold having an upper inlet of square cross section adapted to be fitted to the square exit end of the tube and dividing into two adjoining outlets to each side of the manifold centerline so that in said operating orientation the tube can be aligned over the manifold inlet in selected rotational positions permitting the deflector to direct seed into one or the other or equally to both of the manifold outlets;
   (d) a pair of symetrically arranged distribution and storage chutes comprising
      i. first sections diverging symmetrically at an included angle equal to said certain included angle so that in a stored orientation of the tube wherein the exit end is upwardly the flared outlet end of the tube can be snugly fitted thereto, and
      ii. second vertical sections leading downwardly to respective seed access stations;
   (e) a bottom tray spanning a pair of bottom access stations;
   (f) upper trays spanning pairs of upper access stations;
   (g) baffles in the chute sections for diverting descending seed into the respective access stations;
   (h) means for attaching the feeder to the exterior of a window;
   (i) a one-way transparent wall for viewing feeding birds through said window;
   (j) a closure cap adapted to be removably fitted to the upwardly disposed exit end of the tube in said stored orientation;
   (k) the manifold, the chute sections between the trays and the trays themselves being separate modular units; and
   (l) quick-release interconnecting means for assembling said units together and disassembling them for washing.

* * * * *